(12) United States Patent
Takahama et al.

(10) Patent No.: US 7,882,723 B2
(45) Date of Patent: Feb. 8, 2011

(54) ABNORMALITY DETECTING METHOD FOR FORM MEASURING MECHANISM AND FORM MEASURING MECHANISM

(75) Inventors: Yasuhiro Takahama, Kawasaki (JP); Masaoki Yamagata, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 369 days.

(21) Appl. No.: 12/124,483

(22) Filed: May 21, 2008

(65) Prior Publication Data
US 2008/0295571 A1 Dec. 4, 2008

(30) Foreign Application Priority Data
May 30, 2007 (JP) ............................. 2007-142928

(51) Int. Cl.
G01B 21/20 (2006.01)
G01B 21/30 (2006.01)
G01B 5/20 (2006.01)
G01B 5/28 (2006.01)

(52) U.S. Cl. ........................................ 73/1.79; 73/1.89

(58) Field of Classification Search ................... 33/502; 73/1.79, 1.89, 105; 850/19
See application file for complete search history.

(56) References Cited

U.S. PATENT DOCUMENTS

| | | | | |
|---|---|---|---|---|
| 4,918,627 A * | 4/1990 | Garcia et al. | ................... | 702/82 |
| 5,283,630 A * | 2/1994 | Yoshizumi | ................ | 33/502 X |
| 5,359,511 A * | 10/1994 | Schroeder et al. | .............. | 433/75 |
| 5,657,549 A * | 8/1997 | Shen et al. | ..................... | 33/503 |
| 6,199,024 B1 * | 3/2001 | Bunimovich et al. | .......... | 702/95 |
| 6,453,730 B2 * | 9/2002 | Takemura | .................... | 73/105 |
| 6,701,267 B2 * | 3/2004 | Noda et al. | ................... | 702/95 |
| 6,763,319 B2 * | 7/2004 | Yoshizumi et al. | .......... | 702/168 |
| 6,895,359 B2 * | 5/2005 | Sakurada et al. | ............ | 702/167 |
| 6,909,983 B2 * | 6/2005 | Sutherland | ................... | 702/104 |
| 7,079,969 B2 * | 7/2006 | Taylor et al. | .................. | 702/95 |
| 7,131,207 B2 * | 11/2006 | McFarland | .................... | 33/503 |

(Continued)

FOREIGN PATENT DOCUMENTS

EP 1236972 A2 * 9/2002

(Continued)

Primary Examiner—Thomas P Noland
(74) Attorney, Agent, or Firm—Rankin, Hill & Clark LLP

(57) ABSTRACT

A form measuring mechanism (100) which measures form of an object (102) by bringing a probe (124) into direct contact with the object includes a plurality of reference spheres (130a, 130b) for calibrating the probe, a judging system/controller (154) for judging form abnormal values common in position and size to each other and form abnormal values not common to each other obtained by measuring the reference spheres, and a notifying display unit (156) for notifying at least any one of a contamination or dust adhering state of the probe judged from the common form abnormal values and a worn state and contamination or dust adhering states of the reference spheres judged from the form abnormal values not common to each other. Accordingly, it becomes possible to identify contamination or dust adhesion of the probe or contamination or deformation due to wearing of a reference sphere, and at least in the case of contamination or dust adhesion of the probe or reference sphere, the location of the contamination or dust adhesion can be identified, and in the case of wearing of the probe or reference sphere, a situation of the worn region can be identified or necessity of replacement of the probe or reference sphere can be judged.

16 Claims, 8 Drawing Sheets

U.S. PATENT DOCUMENTS

2003/0069709 A1 * 4/2003 Noda et al. .................. 702/104

FOREIGN PATENT DOCUMENTS

| | | |
|---|---|---|
| EP | 1 422 491 | 5/2004 |
| JP | 2000-035325 | 2/2000 |
| JP | 2001-280947 | 10/2001 |
| WO | WO 2006109094 A1 * | 10/2006 |

* cited by examiner

ABNORMALITY DETECTING METHOD FOR FORM MEASURING MECHANISM AND FORM MEASURING MECHANISM

CROSS-REFERENCE TO RELATED APPLICATION

The disclosure of Japanese Patent Application No. 2007-142928 filed on May 30, 2007 including specifications, drawings and claims is incorporated herein by reference in its entirely.

BACKGROUND OF THE INVENTION

1. Field of the Invention

The present invention relates to an abnormality detecting method for a form measuring mechanism and a form measuring mechanism using various probes such as a scanning probe, a touch signal probe, a probe for a surface roughness measuring machine, a probe for an contour measuring machine, etc., and more specifically, to an abnormality detecting method for a form measuring mechanism which is preferably used in a form measuring mechanism that measures changes of a measured object by bringing a probe into direct contact with the object to be measured, and makes it possible to easily judge contamination and wearing when the contamination and wearing occur on the probe and properly clean or replace the probe, and the form measuring mechanism.

2. Description of the Related Art

In a measuring mechanism which measures a form of an object to be measured, during repetition of measurements of the objects, the tip end of a contact type probe (hereinafter, simply referred to as a probe,) is gradually contaminated by several-micrometer to 0.1 millimeter orders of dust and oil on the object. Then, the contact sensitivity changes or foreign bodies such as dust are caught between the probe tip end and an object, resulting in a measurement abnormality. To avoid this, objects and the probe are soaked in a cleaning liquid and cleaned. However, only soaking in a cleaning liquid cannot sufficiently remove contamination, and removed contamination may adhere again, so that as shown in Japanese Laid-Open Patent Publication No. 2000-35325 (Patent document 1), it has been proposed that air is blown to the probe tip end to clean it as appropriate.

Further, the tip end of the probe is worn and deformed through use. Therefore, to enable accurate measurement even if the tip end of the probe is deformed due to wearing, as shown in Japanese Laid-Open Patent Publication No. 2001-280947 (Patent document 2), it has been proposed that a reference sphere for calibrating the probe form is provided and the probe is calibrated.

However, as shown in FIG. 13(a), assuming that measurement is made by using the reference sphere 30 shown in Patent document 2 in a state that dust 2, etc., adheres to the reference sphere 30 and/or probe 24, a form measured in this case is not the form that should be measured as shown in FIG. 13(b) but is the form measured in actuality as shown in FIG. 13(c). Therefore, from only the result of FIG. 13(c), it cannot be judged whether the measurement abnormality was caused by contamination on the tip end of the probe 24 or contamination on the reference sphere 30. Therefore, this requires extra labor of randomly repeating cleaning and measurement of the tip end of the probe 24 and the reference sphere 30.

Even when the contamination can be judged as contamination on the reference sphere 30 or the tip end of the probe 24, if the location thereof is not sufficiently identified, cleaning must still be repeated a plurality of times.

Further, when the probe 24 is used over a long period of time, even if it is calibrated by using the reference sphere 30, desired measurement accuracy cannot be secured when the probe is extremely worn out, so that the probe 24 needs to be replaced. However, due to influence from the contamination, it is difficult to judge whether the probe 24 has been worn out, and the time of replacement of the probe 24 cannot be judged.

SUMMARY OF THE INVENTION

The present invention was made to solve the conventional problems described above, and an object thereof is to provide an abnormality detecting method for a form measuring mechanism and a form measuring mechanism which make it possible to judge contamination on the tip end of the probe 24, deformation due to wearing on the tip end of the probe 24, or contamination of the reference sphere 30, deformation due to wearing of the reference sphere 30, and make it possible to at least identify a location of contamination in the case of contamination on the tip end of the probe 24 or on the reference sphere 30, judge a state of a worn region in the case of wearing on the tip end of the probe 24 or on the reference sphere 30, or judge whether the probe 24 or on the reference sphere 30 needs to be replaced.

According to the present invention, when detecting an abnormality of a form measuring mechanism which brings a probe into direct contact with an object to be measured to measure the form of the object, a plurality of reference spheres for calibrating the form of the probe are measured, and form abnormal values which are common in position and size to each other and form abnormal values which are not common to each other obtained through measurement of the reference spheres, are judged, and at least any one of a worn state and a contamination including dust adhering of the probe judged from the common form abnormal values and worn states and a contamination including dust adhering of the reference spheres judged from the form abnormal values not common to each other are notified, whereby the problems are solved.

The principle of the solution means of the present invention will be described with reference to FIG. 1. A plurality, for example, two of reference spheres 130a and 130b are prepared and the reference spheres 130a and 130b are measured with the probe 124. At this time, assuming that dust 4 adheres to the surface of the probe 124, dust 6 adheres to the surface of the reference sphere 130a, and dust 8 adheres to the surface of the reference sphere 130b, the measurement results of the reference spheres 130a and 130b are as shown in the lower stage of FIG. 1. At this time, dust 4 of the probe 124 is measured as form abnormal values with an inclination angle θ common in both measurement results. On the other hand, the dust 6 appears only in the measurement result of the reference sphere 130a, and the dust 8 appears only in the measurement result of the reference sphere 130b. Thus, the dust 4 on the probe 124 can be judged from the common form abnormal values of the plurality of reference spheres.

The present invention solves the above-described problems in a form measuring mechanism which brings a probe into direct contact with a measured object to measure the form of an object to be measured, including: a plurality of reference spheres for calibrating the form of the probe; a judging means for judging form abnormal values common in position and size to each other and form abnormal values not common to each other obtained through measurement of the reference spheres; and a notifying means which notifies any one of a worn state and a contamination including dust adhering of the probe judged from the common form abnormal values and worn states and contamination including dust adhering of the reference spheres judged from the form abnormal values not common to each other.

The common form abnormal values can be judged as wearing or contamination including dust adhesion of the probe, and the form abnormal values not common to each other can be judged as wearing or contamination including dust adhesion of the reference sphere.

When the common form abnormal values are concave, they can be judged as wearing of the probe.

By judging the worn state of the probe from the common form abnormal values, a replacement time of the probe can be notified.

When the common form abnormal values are convex, they can be judged as contamination including dust adhering to the probe.

When one of the form abnormal values not common to each other is concave, it can be judged as wearing of the reference sphere.

By judging the worn state of the reference sphere from the not common form abnormal values, a replacement time of the reference sphere can be notified.

When one of the form abnormal values not common to each other is convex, it can be judged as contamination including dust adhering to the reference sphere.

According to the present invention, it can be identified which position on the probe or the reference sphere the contamination including dust adhering to the tip end of the probe or the reference sphere which may cause a measurement error is distributed, so that the tip end of the probe or the reference sphere can be wiped by directly aiming at the locally contaminated portion.

It can be confirmed whether contamination including dust adheres to the probe or the reference sphere, so that meaningless cleaning of other components can be avoided, and the working efficiency is improved.

When form changes of the probe or the reference sphere are continuously traced, the lifetime due to wearing of the probe or the reference sphere can be judged, and more reliable measurement can be made.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, an embodiment of the present invention will be described in detail with reference to the drawings.

Figure 1:
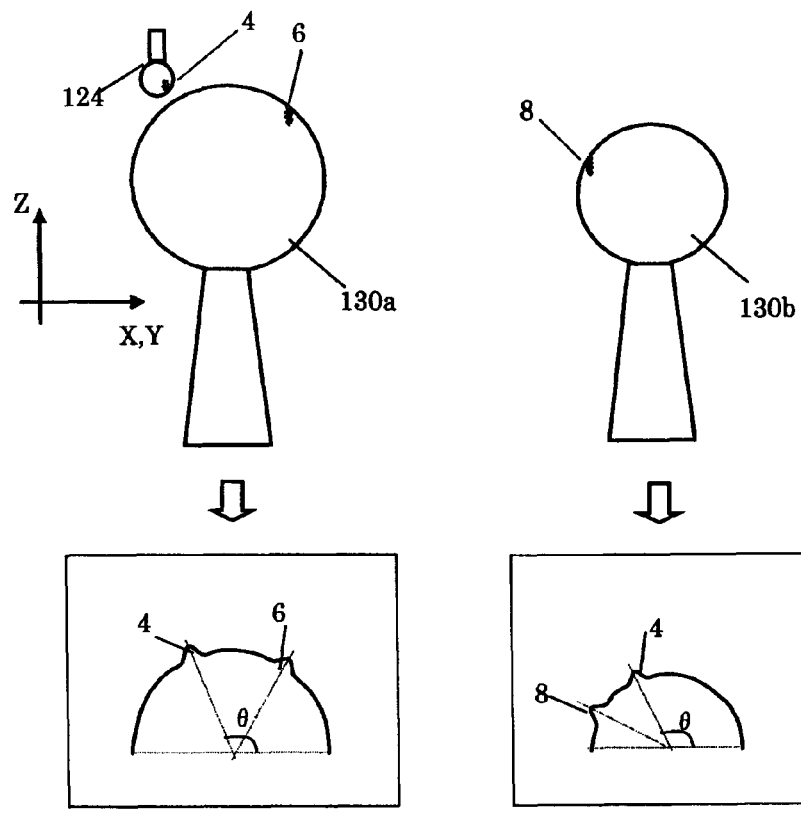
FIG. 1 is a drawing showing a calibration principle of the present invention.
Figure 2:
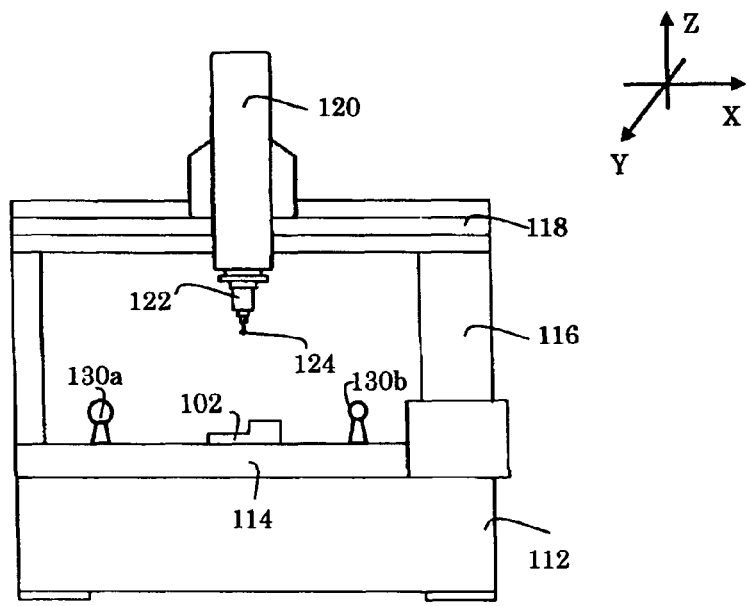
FIG. 2 is a construction schematic diagram of a form measuring mechanism of an embodiment.
Figure 4:
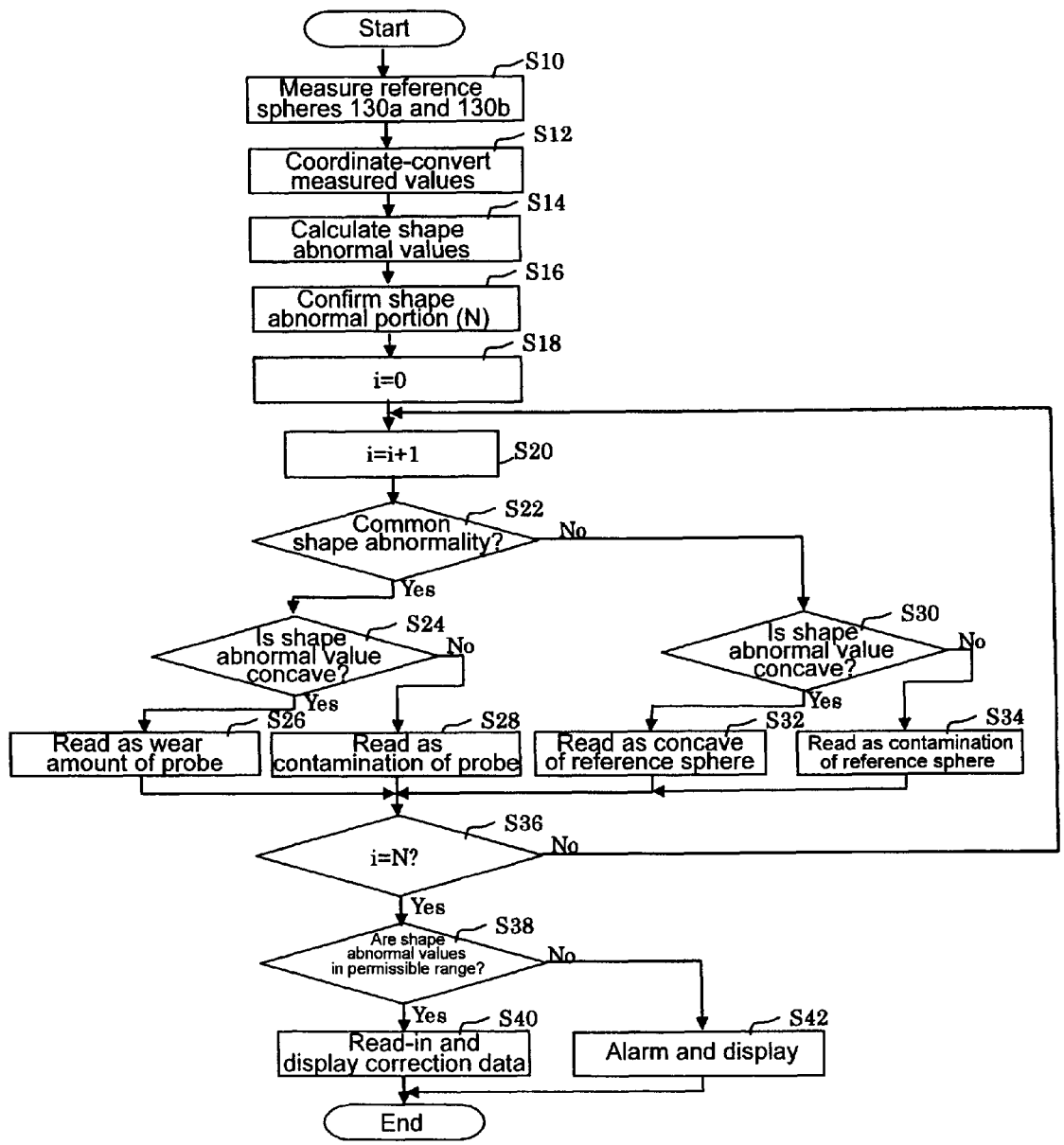
FIG. 4 is a flowchart showing a method for calibrating a probe by using reference spheres of the same embodiment.
Figure 5:
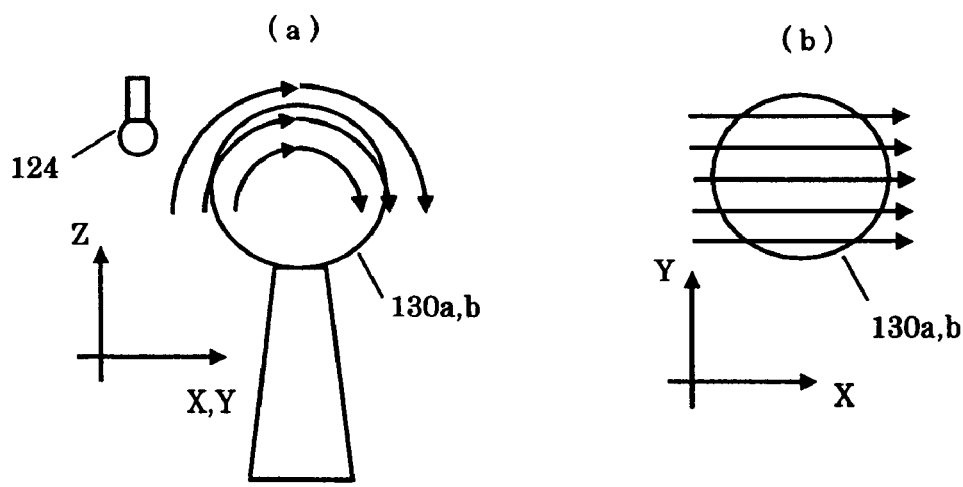
FIG. 5 are drawings showing an actual measuring method for the reference spheres of the same embodiment.
Figure 6:
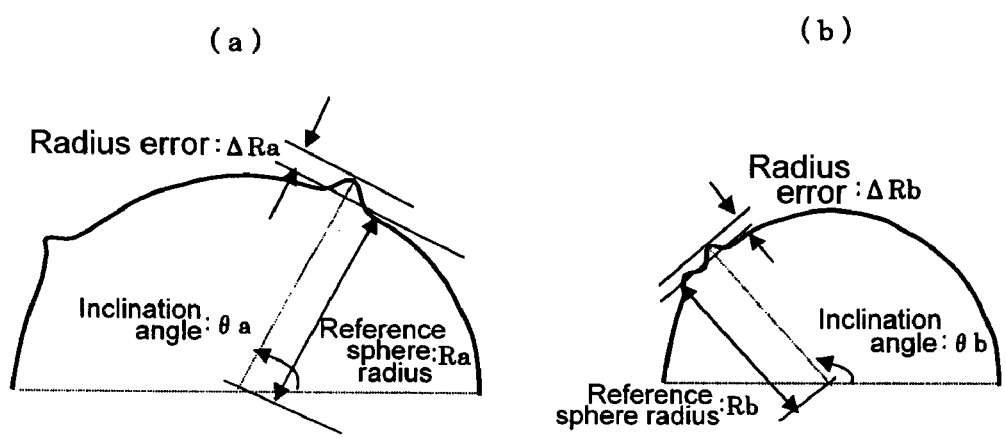
FIG. 6 are drawings showing an example of form measured values of the reference spheres one-dimensionally scanned of the same embodiment.
Figure 7:
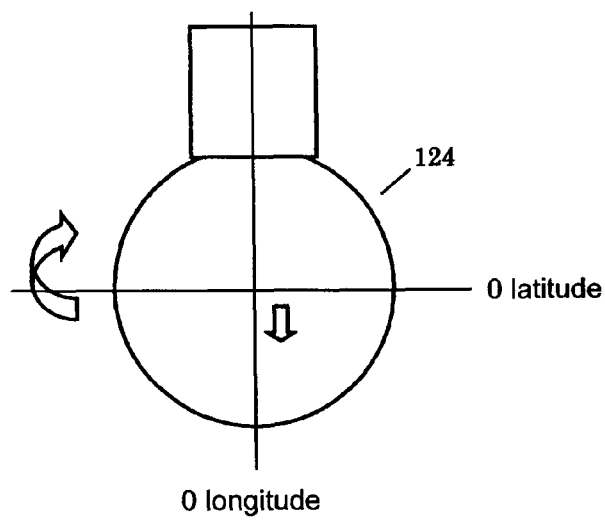
FIG. 7 is a diagram showing a coordinate reference for identifying positions on the probe of the same embodiment.
Figure 8:
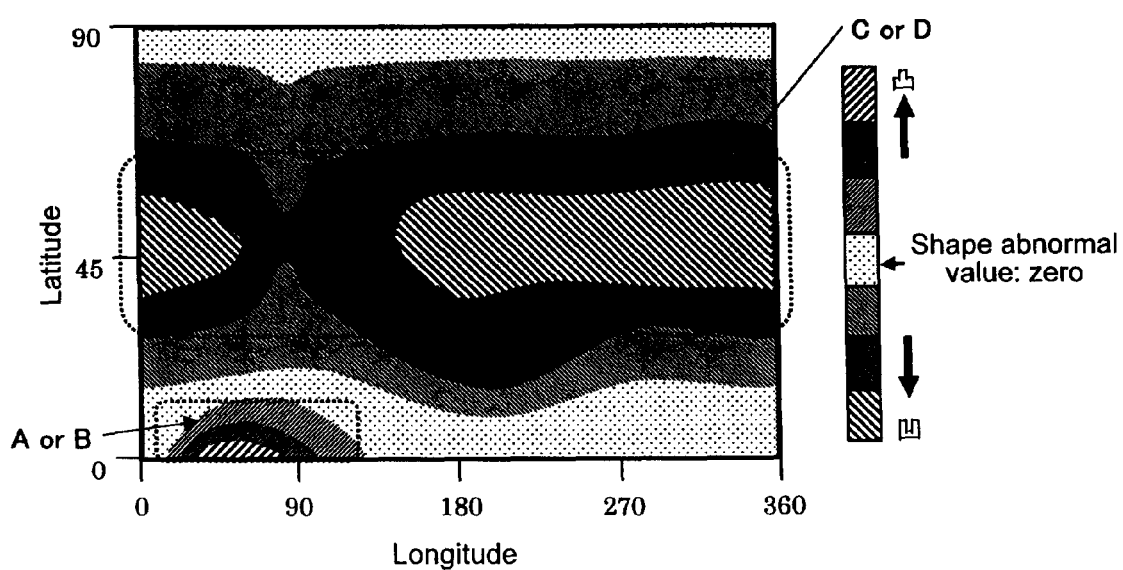
FIG. 8 is a diagram three-dimensionally showing form errors of the same embodiment.
Figure 9:
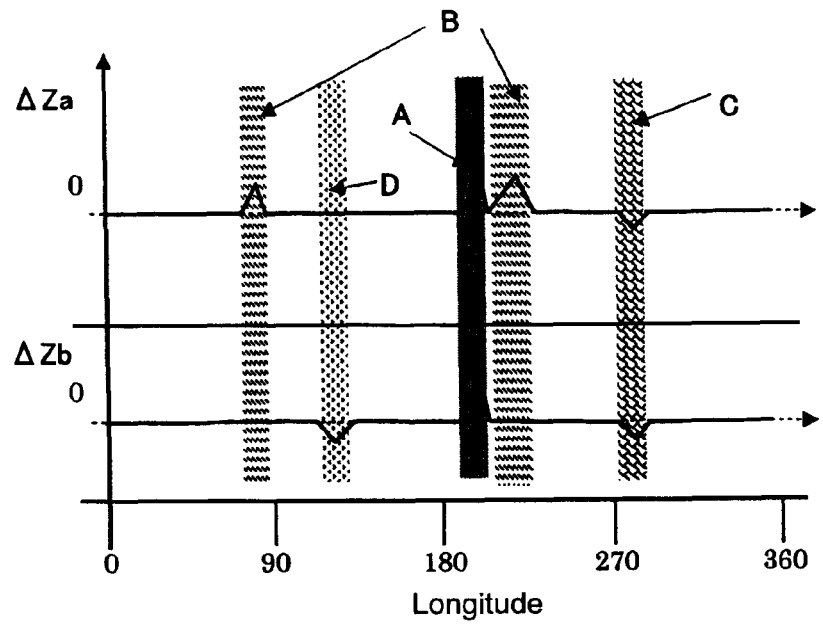
FIG. 9 is a diagram showing form abnormal values of the two reference spheres at a specific latitude of the same embodiment.
Figure 10:
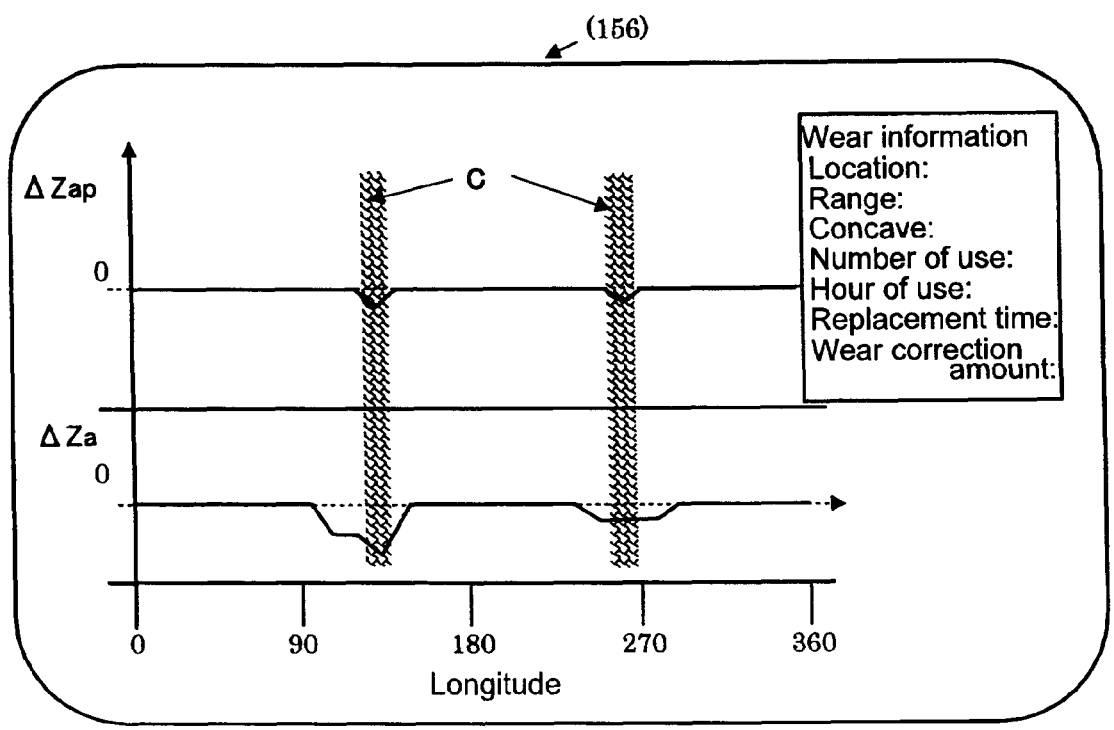
FIG. 10 is a diagram showing an example of comparison of a worn state of the probe with a worn state at the time of previous calibration at a specific latitude displayed on a display unit of the same embodiment.
Figure 11:
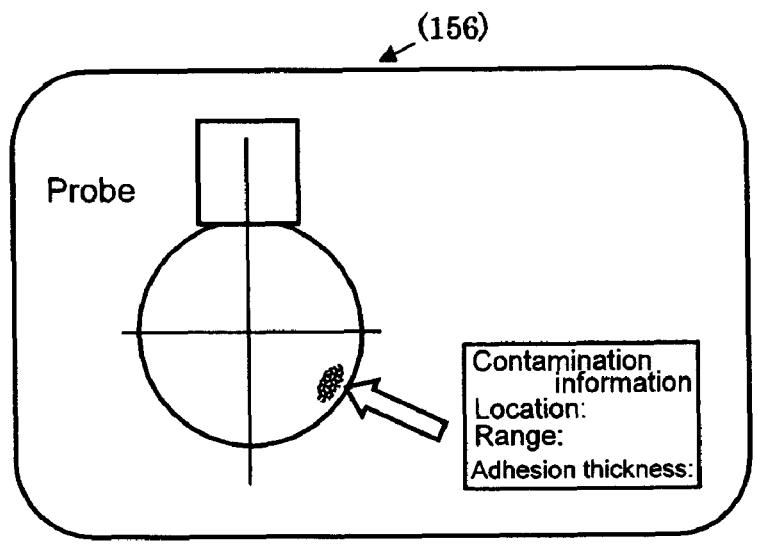
FIG. 11 is a drawing showing an example of a contaminated state of the probe displayed on the display unit of the same embodiment.

A first embodiment of the present invention will be described with reference to FIG. 2 through FIG. 11. FIG. 2 is a construction schematic diagram of a form measuring mechanism of this embodiment, FIG. 3 is an entire block diagram of the form measuring mechanism of this embodiment, FIG. 4 is a flowchart showing a method for calibrating a probe by using reference spheres, FIG. 5 are drawings showing an actual measuring method for the reference spheres, FIG. 6 are drawings showing an example of form measured values of the reference spheres one-dimensionally scanned, FIG. 7 is a diagram showing a coordinate reference for identifying positions on the probe, FIG. 8 is a diagram three-dimensionally showing form errors, FIG. 9 is a diagram showing form abnormal values of the two reference spheres at a specific latitude, FIG. 10 is a diagram showing an example of comparison of a worn state of the probe with a worn state of previous calibration at a specific latitude displayed on a display unit, and FIG. 11 is a drawing showing an example of a contaminated state of the probe displayed on the display unit.

Figure 3:
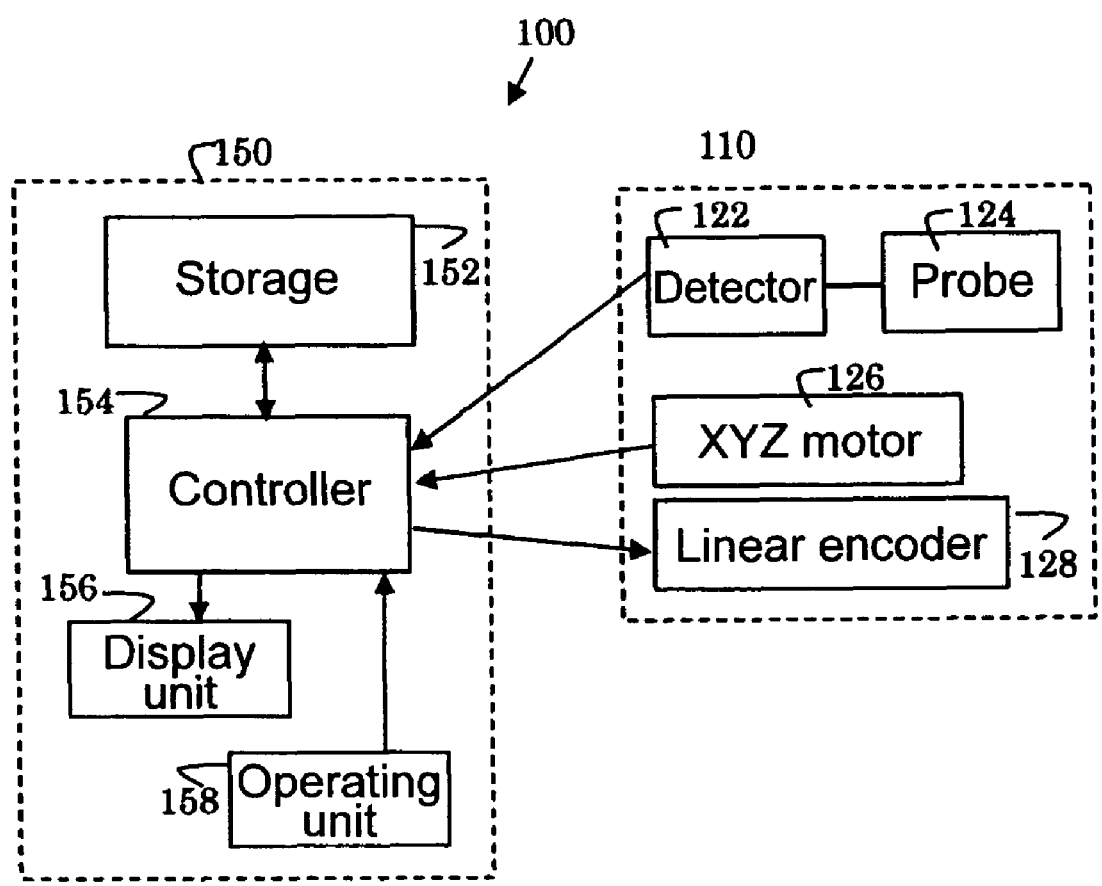
FIG. 3 is an entire block diagram of the form measuring mechanism of the same embodiment.

A form measuring mechanism 100 of this embodiment includes, as shown in FIG. 3, a form measuring mechanism main body 110 and a control device 150. First, the form measuring mechanism main body 110 will be described based on FIG. 2.

The form measuring mechanism main body 110 of this embodiment is, for example, a main body of a three-dimensional coordinate measuring machine, and includes a surface plate 114 on a base 112, and has a head 120 on a gate-formed frame on the surface plate 114. On the head 120, a detector 122 is provided, and to its tip end, a probe 124 is attached. The gate-formed frame is formed by a pair of columns 116 rising from the surface plate 114 and a beam 118 laid across the pair of columns 116. The columns 116 support the beam 118, and the head 120 is movable in the left and right direction (X direction) in the figure along the beam 118. The detector 122 attached to the head 120 is movable in the up and down direction (Z direction) in the figure. The columns 116 are movable in the front and rear direction (Y direction) on the surface plate 114, so that the head 120 is also movable in the Y-axis direction. The detector 122 can detect pressures and displacements via probe 124 in the X, Y, and Z directions. As shown in FIG. 3, for these movements, XYZ motors 126 are used, and moving distances in the respective directions are measured by linear encoders 128.

As shown in FIG. 2, on the surface plate 114, two reference spheres 130a and 130b are provided. The reference spheres 130a and 130b are used as form measurement references for calibration of the probe 124, so that reference spheres with sufficient sphericity whose form errors are negligible, for example, reference spheres with form errors not more than 1/10 of the measurement accuracy of the form measuring mechanism 100 can be used. In this embodiment, for example, as the reference sphere 130a, a reference sphere with a radius larger than that of the reference sphere 130b can be used. To the surface plate 114, an object to be measured 102 is fixed.

Next, the control device 150 will be described with reference to FIG. 3. The control device 150 includes a storage 152, a controller 154, a display unit 156, and an operating unit 158.

The storage 152 is connected to the controller 154, and set values and programs necessary for controlling the form measuring mechanism main body 110 are read therein. Programs to be used for calibrating the probe 124 described later and form abnormal values, reference data, and calibration data of the reference spheres 130a and 130b are also read therein.

The controller 154 is connected to the detector 122, the XYZ motors 126, and the linear encoders 128. When measuring the object 102, for example, the XYZ motors 126 are driven so that the pressure or displacement applied to the detector 122 via the probe 124 becomes constant, and from the values of the linear encoders 128 at this time, the form of the object 102 can be obtained. The controller also functions as a judging means for judging form abnormal values described later.

The display unit 156 is connected to the controller 154, and includes a monitor screen and a speaker, and constitutes a notifying means for notifying information necessary for an operator by means of images and voice as appropriate.

The operating unit 158 has input devices such as a keyboard and a mouse, and is connected to the controller 154. An instruction is inputted by an operator as appropriate, and based on the instruction, processing of the measured values and control are performed.

Next, calibrating operations as a working effect of this embodiment will be described by using FIG. 4 through FIG. 11. The calibrating operations of this embodiment are executed according to a program read in the controller 154 from the storage 152.

When the calibration of the probe 124 by using the reference spheres 130a and 130b of this embodiment is started, first, the two reference spheres 130a and 130b are measured (Step S10 of FIG. 4). At this time, the entire surfaces of the upper hemispheres of the reference spheres 130a and 130b are, for example, thoroughly luster-scanned with the probe 124. Specifically, as shown in FIG. 5(a) and FIG. 5(b), in view in the Z direction, the forms of the reference spheres 130a and 130b are measured at a predetermined interval. At this time, examples of the measured forms of the reference spheres 130a and 130b when they are one-dimensionally scanned are shown in FIG. 6. FIG. 6(a) shows the reference sphere 130a, and FIG. 6(b) shows the reference sphere 130b.

Next, the form measured values of the reference spheres 130a and 130b are coordinate-converted (Step S12 of FIG. 4). When the form measurement is a two-dimensional measurement, as shown in FIG. 6(a) and FIG. 6(b), the forms may be expressed by inclination angles θa and θb and radius errors ΔRa and ΔRb. However, by indicating coordinates on a spherical surface by using a latitude and a longitude, reading-in, reading-out, and processing of the measured values become easy regardless of the sizes of the two reference spheres 130a and 130b, so that the coordinates are converted into a latitude and a longitude in this embodiment. Herein, reference data of the reference spheres 130a and 130b which had been converted into longitudes and latitudes and read-in the storage 152 are read out by the controller 154 and differences are obtained for each reference sphere 130a, 130b.

The results of this are obtained as form abnormal values of the probe 124 (Step S14 of FIG. 4). At this time, by determining a position as a reference of the longitude and latitude of the probe 124 in advance as shown in FIG. 7, a graph showing the form abnormal values of the probe 124 can be obtained as shown in FIG. 8. Herein, FIG. 8 is a diagram three-dimensionally showing form abnormal values by means of contours when measuring one reference sphere 130a on a two-dimensional coordinate system using longitudes and latitudes. As shown in FIG. 8, it can be judged at a glance how the convex of A or B and the concave C or D are distributed on the probe 24. The differences between A and B and between C and D will be described later. Similarly, from the other reference sphere 130b, form measurement results are also obtained.

Next, from the form measured results obtained from the two reference spheres 130a and 130b, form abnormal portions N are confirmed (Step S16 of FIG. 4). Then, to judge all form abnormal portions, a counter in a program for counting the form abnormal portions is initialized (Step S18 of FIG. 4), and judging of the form abnormal portions one by one is started (Step S20 of FIG. 4).

Next, it is judged whether the form abnormal values appear commonly on both the reference spheres 130a and 130b (Step S22 of FIG. 4). This is performed so that, for example, as shown in FIG. 9, by comparing the form abnormal values ΔZa of the reference sphere 130a and the form abnormal values ΔZb of the reference sphere 130b at a specific latitude, the same form abnormal values at the same longitude are judged as convex A or concave C.

Next, when a form abnormal value is common between both the two ΔZa and ΔZb, it is judged whether its form is concave (Step S24 of FIG. 4). Referring to FIG. 9, in ΔZa and ΔZb, the values that are both 0 or less are judged as C. When the form abnormal value is concave in both two ΔZa and ΔZb, the concave is judged as being caused by wearing of the probe 124, and the position thereof and the abnormal value are read in the storage 152 (Step S26 of FIG. 4). When the form abnormal value is not concave but convex in both two ΔZa and ΔZb, the convex is judged as contamination or dust adhering to the probe 124, and the position thereof and the abnormal value are read in the storage 152 (Step S28 of FIG. 4).

When a form abnormal value is not common between ΔZa and ΔZb, as shown in FIG. 9, it is judged as convex B on only one reference sphere or concave D on only one reference sphere, and then it is judged whether the form abnormal value is concave (Step S30 of FIG. 4). Referring to FIG. 9, in ΔZb, when a form abnormal value is not more than 0, it is judged as D. When a form abnormal value is concave in either of ΔZa and ΔZb, it is judged as a concave of the reference sphere 130a or 130b and a position thereof and the abnormal value are read in the storage 152 (Step S32 of FIG. 4). When a form abnormal value is convex in either of ΔZa and ΔZb, it is judged as contamination or dust adhering to the reference sphere 130a or 130b and the position thereof and the abnormal value are read in the storage 152 (Step S34 of FIG. 4).

After judging one form abnormal portion, all portions N are judged in order (Step S36 of FIG. 4). After judging all portions N, it is judged whether the form abnormal values are in a permissible range (Step S38 of FIG. 4). The judgment as to whether the abnormal values are in a permissible range is made by the controller 154 by reading permissible values of the wear amounts, concaves, and contamination or dust adhering amounts of the reference spheres 130*a* and 130*b* and the probe 124 in the storage 152 in advance.

When the abnormal values are in the permissible range, correction data is read from the storage 152, and the situation of the form abnormal values and correction details are displayed (Step S40 of FIG. 4). The correction data is prepared in advance in the storage 152. At this time, for example, regarding the wear amount, when the form abnormal value $\Delta Za$ at the time of current calibration is larger than the form abnormal value $\Delta Zap$ at the time of the previous calibration and the wear amount of the probe 124 progresses more, as shown in FIG. 10, the worn state is displayed on the display unit 156, the lifetime and replacement time of the probe 124 are calculated from the number of uses and use time since the previous calibration and displayed on the display unit 156, and further, the current wear correction amount can also be displayed. The contamination and concaves on the reference spheres 130*a* and 130*b* are also judged and displayed.

If the abnormal value is not in the permissible range, a warning is issued to an operator and replacement of a corresponding component or a cleaning portion of the component is displayed (Step S42 of FIG. 4). For example, when the probe 124 is contaminated, as shown in FIG. 11, the location, range, and adhesion thickness as information of this contamination can be displayed in a manner enabling visual judgment thereof. The cleaning and replacement of the reference spheres 130*a* and 130*b* and replacement of the probe 124 due to wearing can also be judged and displayed in the same manner.

Then, the calibration using the reference spheres 130*a* and 130*b* in this embodiment is finished, however, if the form abnormal values are not in the permissible range, for confirmation, the calibration using the reference spheres 130*a* and 130*b* of this embodiment can be performed after cleaning.

Thus, according to this embodiment, contamination or dust adhesion on the tip end of the probe 124, deformation due to wearing of the tip end of the probe 124, contamination or dust adhesion of the reference spheres 130*a* and 130*b*, and concaves including deformation due to wearing of the reference spheres 130*a* and 130*b* can be judged. Therefore, when cleaning the contamination or dust, only the corresponding component can be cleaned, and it is not necessary to wastefully clean other components, so that the working efficiency is improved.

In the case of contamination or dust adhesion on the tip end of the probe 124, it can be identified what position and how much the contamination or dust adhesion is distributed on the probe 124, so that the locally contaminated or dust adhesion portion on the tip end of the probe 124 can be directly wiped off.

In the case of deformation due to wearing of the tip end of the probe 124, the situation of the worn region can be grasped, and correction can be made in a correctable range and accurate form measurement can be made. If it cannot be corrected, the probe can be quickly replaced. By comparing the wear amounts of the previous calibration time and this calibration time, form changes of the probe 124 can be continuously traced, so that the lifetime due to wearing of the probe 124 can be judged in advance, and the effect of the correction enables measurement with higher reliability until the end of the lifetime.

In the case of contamination or dust adhesion of the reference sphere 130*a* or 130*b*, it can be identified what position and how much the contamination or dust adhesion is distributed on the reference sphere 130*a* or 130*b*, so that the locally contaminated or dust adhesion portion of the reference sphere 130*a* or 130*b* can be directly wiped off.

In the case of a concave of the reference sphere 130*a* or 130*b*, when it is in the permissible range, it can be reflected on the correction data and accurate form measurement can be made. If it is out of the permissible range, the reference sphere 130*a* or 130*b* can be quickly replaced.

Even when the reference sphere 130*a* (130*b*) and the probe 124 are contaminated or dust adhesion at the same longitude and the same latitude, by measuring the form at the same longitude and the same latitude of the reference sphere 130*b* (130*a*), it can be judged whether the contamination or dust adhesion is of the probe 124 or of the reference sphere 130*a* (130*b*).

In the embodiment described above, the two reference spheres 130*a* and 130*b* have different radiuses, however, they may have the same radius. When the reference spheres 130*a* and 130*b* are sufficiently high in accuracy for calibrating the probe 124, reference data is not always necessary.

The number of reference spheres is not limited to two, and three or more may be arranged on the surface plate 114. In this case, when contamination, etc., are at the same latitude and the same longitude on the probe 124 and two reference spheres, an effect of making it easy to distinguish the contamination is obtained.

Figure 12:
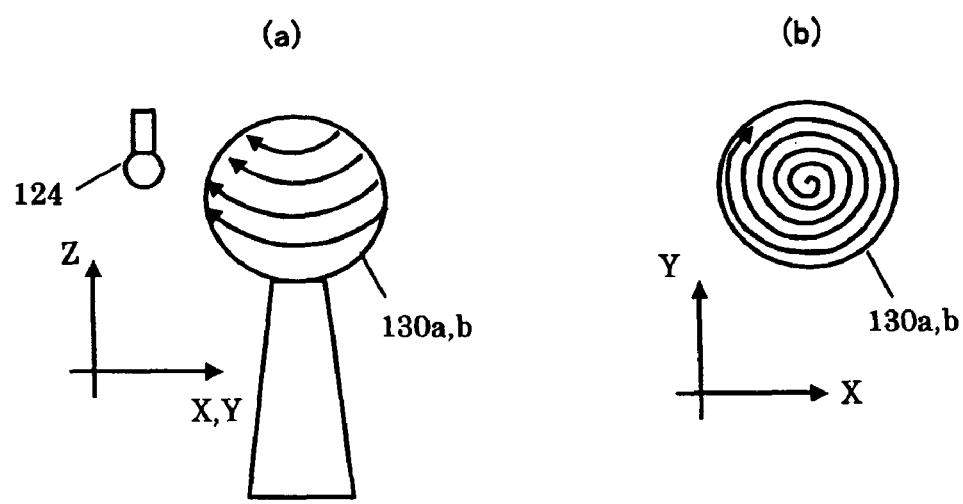
FIG. 12 are drawings showing an actual measuring method for the reference spheres different from the first embodiment.
Figure 13:
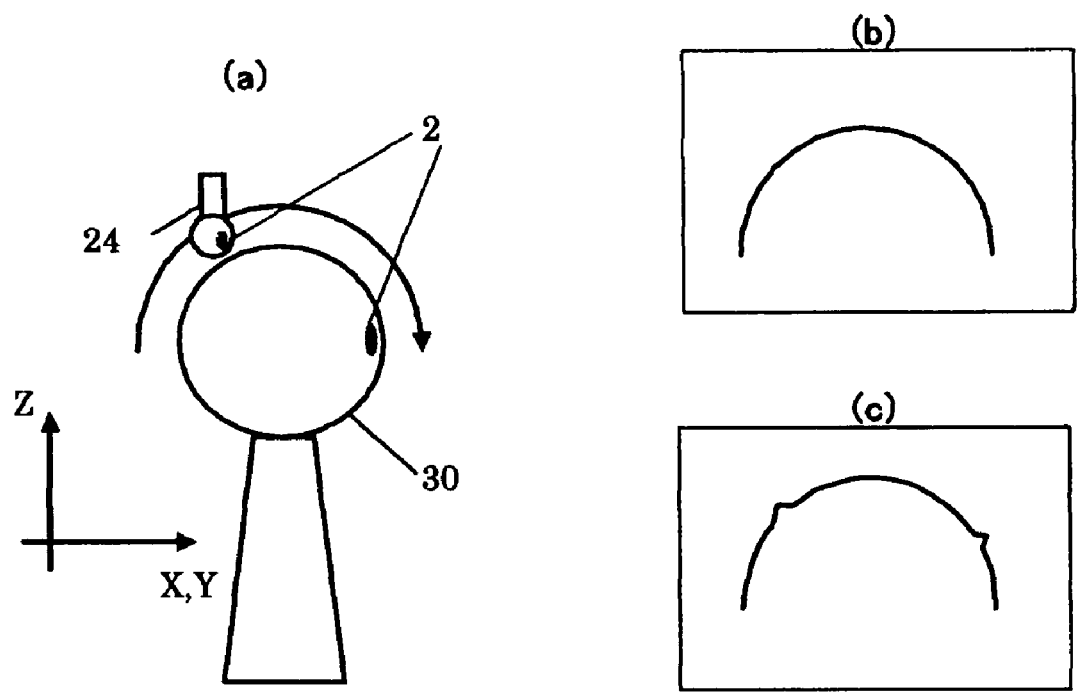
FIG. 13 are drawings showing forms measured when using a conventional reference sphere.

The method for scanning the reference spheres 130*a* and 130*b* was luster scanning, however, the present invention is not limited to this, and spiral scanning shown in FIG. 12 can be performed.

The X direction and Y direction are used for convenience, and the X axis and Y axis may be set vice versa.

In this embodiment, it is judged first whether form abnormal values obtained by using two reference spheres 130*a* and 130*b* are common to each other, however, a method in which it is judged first whether the form abnormal values are concave or convex is also included in the present invention.

In this embodiment, the permissible range of the form abnormal values and correction data are read in the storage 152 and used, however, the present invention is not limited to this, and input values from the operating unit 158 may be used.

Those to be displayed on the monitor of the display unit 156 are not limited to FIG. 10 or FIG. 11, and to notify an operator of information as to where contamination, etc., adheres to from the measurement results, FIG. 4 through FIG. 9 themselves or a part or a combination of these maybe displayed at each step of the flowchart of FIG. 4, or voice guidance may be given.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the present invention.

What is claimed is:

1. An abnormal detecting method for a form measuring mechanism which measures a form of an object to be measured by bringing a probe into direct contact with the object, comprising steps of measuring a plurality of reference spheres for calibrating the form of the probe, distinguishing form abnormal values which are common in position and size and form abnormal values which are not common, obtained by the measurement of the reference spheres, and notifying at least any one of a worn state and a contamination or dust adhering state of the probe judged from the common form abnormal values and worn states and dust contamination or adhering states of the reference spheres judged from the form abnormal values not common to each other.

2. The abnormality detecting method for a form measuring mechanism according to claim 1, wherein the common form abnormal values are judged as wearing or contamination or dust adhesion of the probe, and the form abnormal values that are not common to each other are judged as wearing or contamination or dust adhesion of the reference sphere.

3. The abnormality detecting method for a form measuring mechanism according to claim 2, wherein when the common form abnormal values are concave, they are judged as wearing of the probe.

4. The abnormality detecting method for a form measuring mechanism according to claim 3, wherein a replacement time of the probe is notified by judging a worn state of the probe from the common form abnormal value.

5. The abnormality detecting method for a form measuring mechanism according to claim 2, wherein when the common form abnormal values are convex, they can be judged as contamination or dust adhesion of the probe.

6. The abnormality detecting method for a form measuring mechanism according to claim 2, wherein when one of the form abnormal values not common to each other is concave, it can be judged as wearing of the reference sphere.

7. The abnormality detecting method for a form measuring mechanism according to claim 6, wherein a replacement time of the reference sphere is notified by judging a worn state of the reference sphere from the not common form abnormal value.

8. The abnormality detecting method for a form measuring mechanism according to claim 2, wherein when one of the form abnormal values not common to each other is convex, it is judged as contamination or dust adhesion of the reference sphere.

9. An abnormality detecting device for a form measuring mechanism which measures a form of an object to be measured by bringing a probe into direct contact with the object, comprising:

means for measuring a plurality of reference spheres for calibrating the form of the probe, means for distinguishing form abnormal values which are common in position and size and form abnormal values which are not common, obtained by the measurement of the reference spheres, and means for notifying at least any one of a worn state and a contamination or dust adhering state of the probe judged from the common form abnormal values and worn states and dust contamination or adhering states of the reference spheres judged from the form abnormal values not common to each other.

10. The abnormality detecting device for a form measuring mechanism according to claim 9, wherein the common form abnormal values are judged as wearing or contamination or dust adhesion of the probe, and the form abnormal values that are not common to each other are judged as wearing or contamination or dust adhesion of the reference sphere.

11. The abnormality detecting device for a form measuring mechanism according to claim 10, wherein when the common form abnormal values are concave, they are judged as wearing of the probe.

12. The abnormality detecting device for a form measuring mechanism according to claim 11, wherein a replacement time of the probe is notified by judging a worn state of the probe from the common form abnormal value.

13. The abnormality detecting device for a form measuring mechanism according to claim 10, wherein when the common form abnormal values are convex, they can be judged as contamination or dust adhesion of the probe.

14. The abnormality detecting device for a form measuring mechanism according to claim 10, wherein when one of the form abnormal values not common to each other is concave, it can be judged as wearing of the reference sphere.

15. The abnormality detecting device for a form measuring mechanism according to claim 14, wherein a replacement time of the reference sphere is notified by judging a worn state of the reference sphere from the not common form abnormal value.

16. The abnormality detecting device for a form measuring mechanism according to claim 10, wherein when one of the form abnormal values not common to each other is convex, it is judged as contamination or dust adhesion of the reference sphere.

* * * * *